United States Patent [19]

Splittstoesser et al.

[11] Patent Number: 5,569,106

[45] Date of Patent: Oct. 29, 1996

[54] AUTOTENSIONER FOR DRIVE CHAIN OF SELF-PROPELLED LAWN MOWER

[75] Inventors: Clair D. Splittstoesser, Coffeyville, Kans.; Brian C. Crockett, Bartlesville, Okla.; Ronald J. Eisenbart, Cherryvale, Kans.

[73] Assignee: Dixon Industries, Inc., Coffeyville, Kans.

[21] Appl. No.: 526,739

[22] Filed: Sep. 12, 1995

[51] Int. Cl.$^6$ .............................. F16H 7/22; A01D 34/43
[52] U.S. Cl. .......................... 474/125; 474/133; 474/135; 56/11.6; 56/14.8
[58] Field of Search ............................. 474/1, 101, 119, 474/125, 133, 135; 56/11.6, 14.8, DIG. 22; 74/471 R, 473 R

[56] References Cited

U.S. PATENT DOCUMENTS

| | | |
|---|---|---|
| 326,695 | 9/1885 | Wardwell ............................ 474/117 |
| 1,513,473 | 10/1924 | Ackerman . |
| 2,997,890 | 8/1961 | Burrows et al. . |
| 3,325,095 | 6/1967 | Mueller et al. . |
| 3,908,476 | 9/1975 | Folkert ............................ 74/242.11 A |
| 4,312,267 | 1/1982 | Shenberger ........................ 474/118 X |
| 4,325,210 | 4/1982 | Marto ................................ 474/135 X |
| 4,362,525 | 12/1982 | Sproul .................................... 474/117 |
| 4,557,710 | 12/1985 | Greider .................................. 474/118 |
| 4,582,504 | 4/1986 | Schlapman et al. ................ 474/133 X |
| 4,771,856 | 9/1988 | Hutchison et al. ..................... 474/1 X |
| 4,925,437 | 5/1990 | Suzuki et al. ........................... 474/135 |
| 4,934,989 | 6/1990 | Furukawa et al. ..................... 474/135 |
| 5,146,735 | 9/1992 | McDonner ........................... 56/11.6 X |
| 5,354,241 | 10/1994 | Trefz et al. ........................ 474/135 X |

*Primary Examiner*—Roger J. Schoeppel
*Attorney, Agent, or Firm*—Hovey, Williams, Timmons & Collins

[57] ABSTRACT

An automatic tensioner to be used with a drive train of a self-propelled mower for drivingly connecting a ground wheel to the mower transmission, wherein the tensioner includes tensioning mechanism, which may be constructed as a spring biased idler arm having an idler member rotatably mounted thereon, to apply a tensioning force against the flexible element of the drive. The tensioner further includes an anti-slackening assembly having an elongated takeup rod being pivotally coupled with the idler arm at one end thereof so that the takeup rod moves generally with the idler arm, as the arm moves in a tensioning direction and opposed slackening direction. The anti-slackening assembly also includes a swingable control tab having an aperture receiving the other end of the takeup rod. The tensioner is constructed so that the takeup rod engages the aperture of the control tab to swing the control tab to a disposition in which the takeup rod is generally aligned with the aperture permitting relative movement therebetween as the idler arm and takeup rod move in the tensioning direction, and to alternatively swing the control tab to a locking position in which the takeup rod is canted within the aperture to prevent the idler arm and takeup rod from moving in the slackening direction.

8 Claims, 2 Drawing Sheets

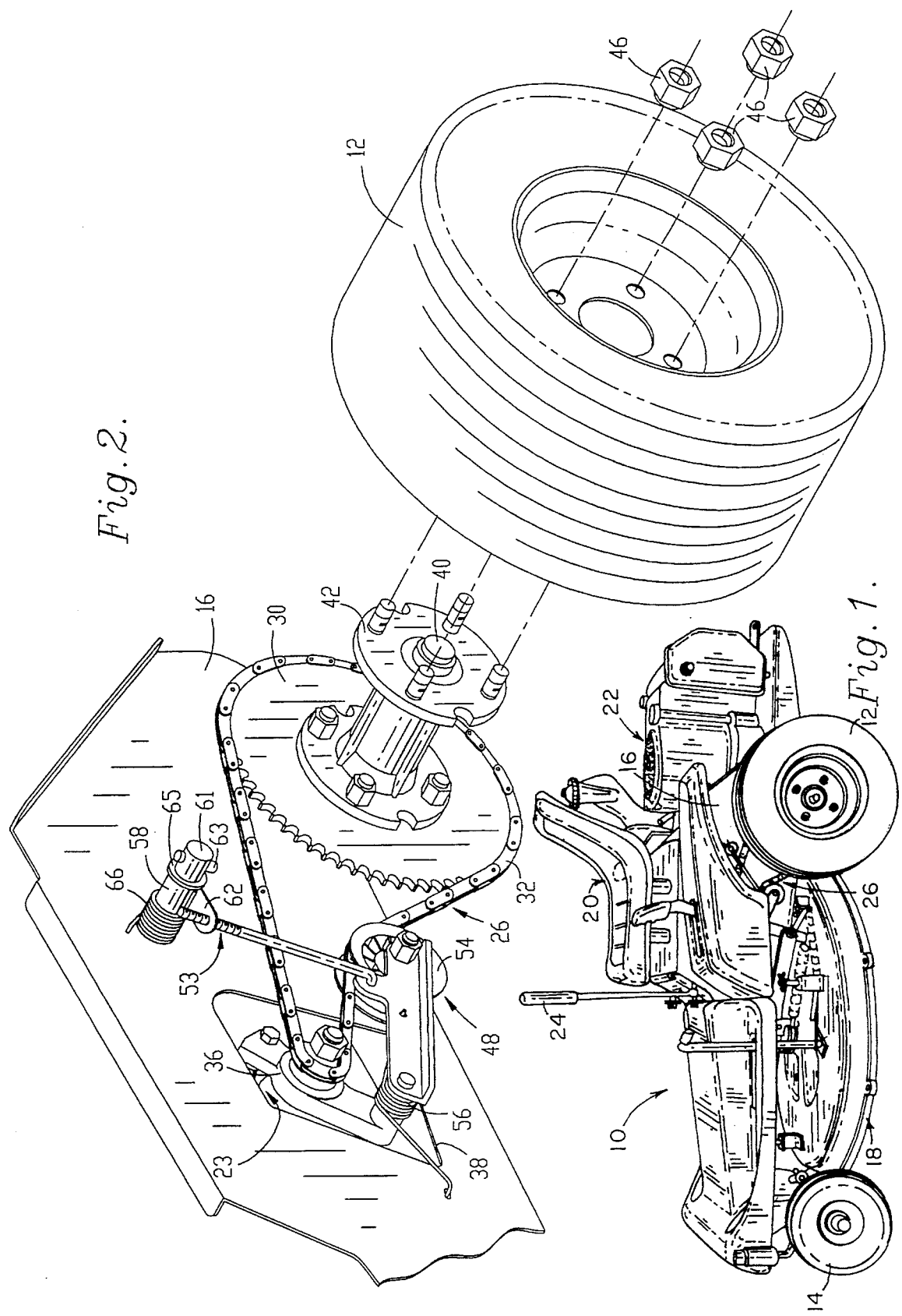

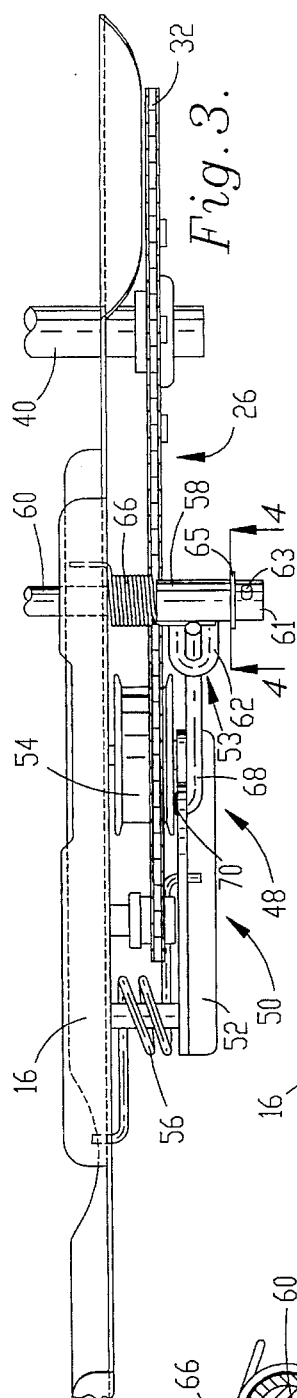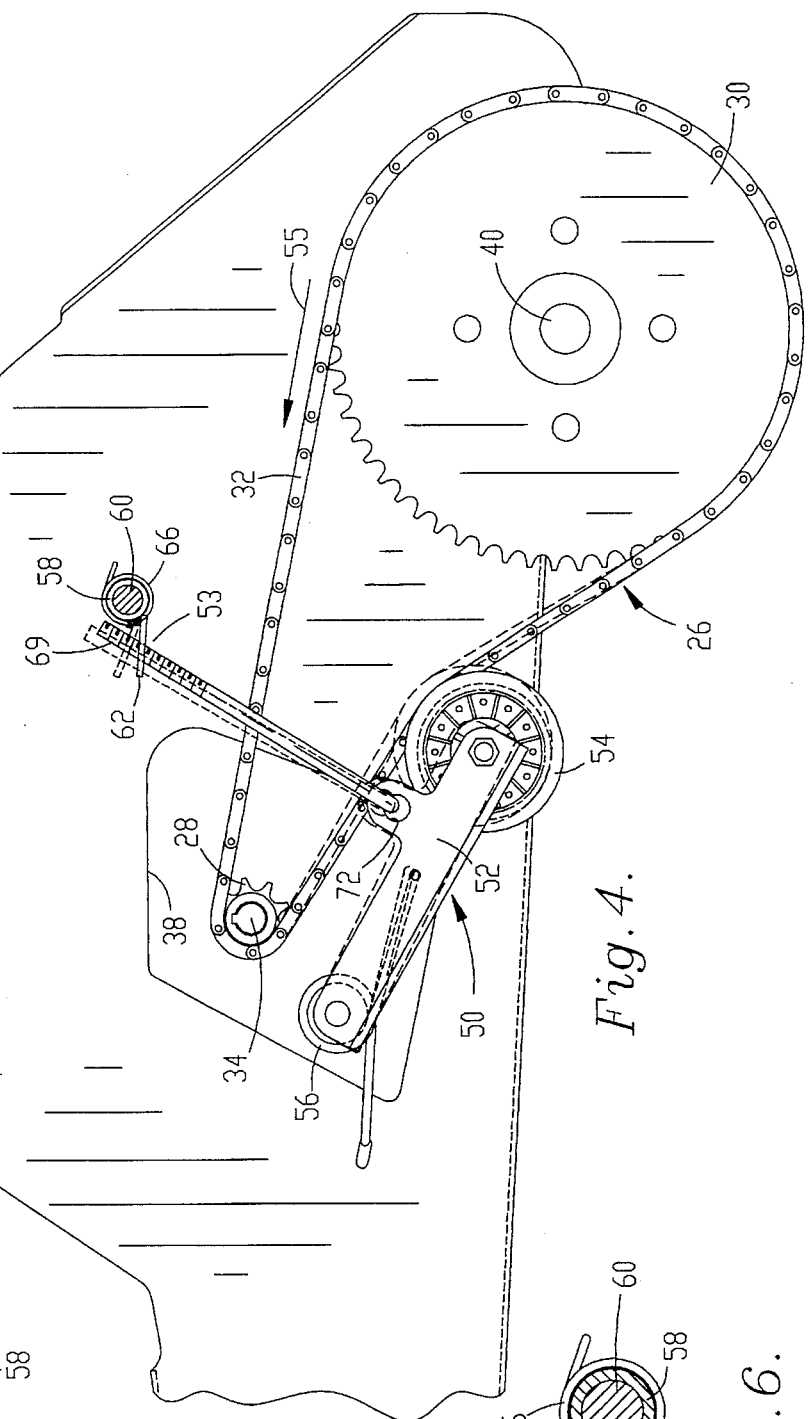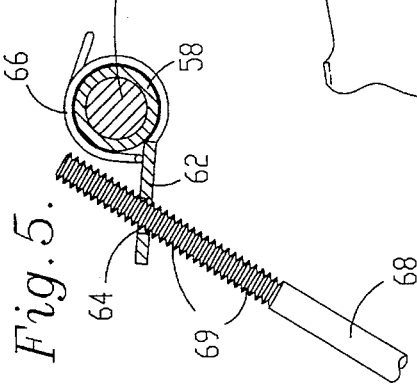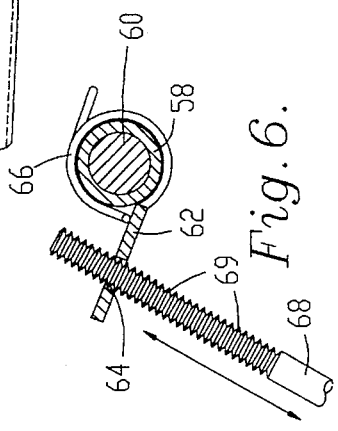

AUTOTENSIONER FOR DRIVE CHAIN OF SELF-PROPELLED LAWN MOWER

BACKGROUND OF THE INVENTION

1. Field of the Invention

The present invention relates generally to self-propelled mowers, and more particularly, to an automatic tensioning device for a drive train, which drivingly connects a ground wheel to the mower transmission, wherein the tensioning device prevents retrograde slackening of the drive train caused by shock forces or reversing the directional movement of the train.

2. Discussion of the Prior Art

Conventionally, self-propelled mowers are provided with one or more driven ground wheels which are drivingly connected to the mower transmission by a drive train, such as a chain or belt drive. In a vast majority of these known constructions, the transmission is geared so that the drive train and ground wheel are reversible. Further, mower transmissions are often the means for braking the ground wheel. In mowers having two driven ground wheels, wherein each wheel has an independent transmission and speed control, the reversible ground wheels provide steering and bi-directional movement of the mower. The ornamental appearance of such a mower has been claimed in co-pending application Ser. No. 29/012,525, filed Sep. 3, 1993, in the names of Donald F. Crosby, et al., which is assigned of record to the assignee of the present application.

In both the unidirectional and reversible constructions, the drive train connecting the ground wheel with the mower transmission typically includes a drive pulley or sprocket, a driven pulley or sprocket, and a flexible, endless element entraining the sprockets or pulleys. Traditionally, an idler assembly having an idler arm and rotatable idler pulley or sprocket is biased in a tensioning direction to take up slack of the element as it stretches due to wear or loading conditions. Removal of slack tends to prevent the element from coming off the pulleys or sprockets and provides quicker transition from forward to reverse. In the case of a belt drive, the idler assembly is further biased to apply a sufficient tensioning force against the element so that torque is transmitted from the drive pulley to the driven pulley.

The idler assembly is commonly disposed so that the idler pulley or sprocket applies a tensioning force against the slack run of the element as the drive train moves in a forward direction, which corresponds with forward movement of the mower. However, with transmissions that provide braking power for the ground wheels, braking causes the slack run to tighten, which resists the tensioning bias of the idler. Further, in the case of a reversible drive train, when the train direction is reversed, the slack run becomes taut, which similarly resists the tensioning bias of the idler. In instances of a relatively weak idler bias, such as with chain drives, the now taut run of the element moves the idler in a retrograde slackening direction. However, in order to maintain driving connection between the pulleys or sprockets in the reverse direction, take up of the slack must continue and the tension must be maintained.

Accordingly, idler assemblies have been provided with biasing springs that over-tension the element as it moves in the forward direction, so that a residual bias prevents slackening of the element and maintains tension on the element when it shifts to the reverse direction. However, over-tensioning of the flexible element often leads to shortened element life. Alternatively, devices have been developed for reversible drive trains that maintain tension on the element and prevent retrograde slackening thereof without over-tensioning the element as it moves in a forward direction. Such devices are often configured similar to a conventional idler assembly but having a biased idler sheave for applying a tensioning force against the drive train element and a locking mechanism for preventing the sheave from moving in a retrograde slackening direction; both components being a single complex structure. Additionally, devices have been provided having a pair of tensioning pulleys, each being associated with opposed runs of the element. The tensioning pulleys are operably coupled so that at any given time, only one of the tensioning pulleys applies a tensioning force against an associated slack run of the element. As the direction of the element alternates from forward to reverse, the tensioning pulleys independently apply a tensioning force against alternating slack runs of the element. However, these conventional devices, which were developed to prevent over-tensioning of the element of a reversible drive train while taking up slack in both the forward and reverse direction, are considerably complex and expensive. Further, such devices are not capable of being used with conventional idler assemblies.

OBJECTS AND SUMMARY OF THE INVENTION

Accordingly, an important object of the present invention is to provide a tensioner for use with a drive train, which connects the ground wheel of a self-propelled mower to the mower transmission, that is less complex and more economical than conventional tensioning devices. It is another object of the present invention to provide a tensioner that is not required to over-tension the flexible element of the drive in order to prevent slackening of the element and maintain the tension on the element. A further object of the invention is to provide a tensioner having means for preventing retrograde slackening of the element, which may be used with a conventional idler assembly. A still further object of the present is to provide an improved automatic tensioner for a reversible drive train.

In accordance with these and other objects evident from the following description of a preferred embodiment of the invention, the tensioner includes tensioning mechanism for tensioning the flexible endless element of a mower drive train, wherein the tensioning mechanism has a pivotal idler arm, an idler member rotatably supported by the arm, and structure for biasing the arm in a tensioning direction such that the idler member applies a tensioning force against the element. The tensioner also includes an anti-slackening assembly for preventing retrograde movement of the idler arm in a slackening direction. The anti-slackening assembly includes an elongated takeup rod having proximal and distal ends and a swingable control tab having an aperture receiving the distal end of the takeup rod. At its proximal end, the takeup rod is pivotally coupled with the idler arm such that the takeup rod moves generally with the idler arm in the tensioning and slackening directions. At its distal end, the takeup rod projects through and binds up in the aperture of the control tab to swing the control tab to a disposition in which the takeup rod is generally aligned with the aperture permitting relative movement therebetween as the idler arm and takeup rod move in the tensioning direction, and to alternatively swing the control tab to a locking position in which the takeup rod is canted within the aperture to prevent the idler arm and takeup rod from moving in the slackening direction.

BRIEF DESCRIPTION OF THE DRAWING FIGURES

A preferred embodiment of the invention is described in detail below with reference to the attached drawing figures, wherein:

FIG. 1 is a perspective view of a self-propelled mower employing an automatic tensioner in accordance with the present invention;

FIG. 2 is a fragmentary perspective view of the tensioner, the wheel being exploded away from the drive train to illustrate the tensioner and the drive train of the mower;

FIG. 3 is a fragmentary top plan view of the drive train and tensioner, particularly illustrating the relative alignment and positioning of the various components of the tensioner and drive train;

FIG. 4 is a vertical cross-sectional view of the drive train and tensioner taken along line 4—4 of FIG. 3, particularly illustrating the operation of the tensioner;

FIG. 5 is an enlarged, fragmentary, vertical sectional view taken inwardly of line 4—4 of FIG. 3 illustrating the takeup rod and control tab of the tensioner, particularly showing the takeup rod being canted within the aperture of the control tab preventing relative movement therebetween; and FIG. 6 is an enlarged, fragmentary, vertical cross-sectional view similar to FIG. 5, but illustrating the takeup rod being generally aligned with the aperture of the control tab, allowing relative movement therebetween.

DETAILED DESCRIPTION OF THE PREFERRED EMBODIMENT

A self-propelled lawn mower, generally designated 10, assembled with an automatic tensioner constructed in accordance with a preferred embodiment of the present invention, is shown in FIGS. 1 and 2. The mower 10 generally includes two pairs of ground engaging wheels 12 and 14, a frame 16 structurally supporting the various mower components, a mower assembly 18 suspended from the frame 16 between the front wheels 14 and rear wheels 12, a seat 20 for the operator, an engine 22, a transmission drive 23 mounted beneath the seat and forward of the engine 22, a pair of hand levers 24 for operating the transmission drive, and a drive train 26 drivingly connecting the rear ground wheels 12 to the transmission drive 23.

The front wheels 14 of the lawn mower 10 are not driven, but simply support the mower above the ground, while the rear wheels 12 advance the mower across the ground. No steering wheel is provided since control of the direction of the lawn mower is achieved by independently controlling the direction and speed of rotation of the rear wheels 12 via the hand levers 24.

Thus, the illustrated mower 10 includes a transmission drive 23 that independently and reversibly drives the rear ground wheels 12. Further, the transmission drive 23 is the means for braking the ground wheels 12. Such a transmission drive for a self-propelled mower is the subject of co-pending application Ser. No. 08/243,966, filed May 17, 1994, in the names Clair D. Splittstoesser, et al., which is assigned of record to the assignee of the present application. It will be appreciated, however, that the principles of the present invention are equally applicable to a lawn mower having a single reversibly driven ground wheel. Further, the principles of the present invention are also equally applicable to a lawn mower having one or more ground wheels driven only in a single direction. It is further understood that each rear ground wheel 12 is connected to the transmission drive 23 by a similarly configured drive train 26, however, for the sake of brevity, only one of the drive trains 26 is discussed in detail hereinbelow.

With the foregoing in mind, the drive train 26 shown in FIGS. 2–4 includes a small drive sprocket 28, a relatively larger wheel sprocket 30, and a flexible, endless chain 32 entraining the sprockets 28 and 30. The drive sprocket 28 is carried on an output shaft 34 of the transmission drive 23. As best illustrated in FIG. 2, the output shaft 34 extends from an output assembly 36 of the transmission and through an opening 38 cut in the frame 16. The wheel sprocket 30 is carried by shaft 40 rearwardly and downwardly from the output shaft 34. A yoke 42 is secured adjacent the outside face of the sprocket 34 by conventional fasteners 44. The yoke 42 is similarly fastened to the ground wheel 12 by lug nuts 46. Although the drive train 26 has been illustrated as a chain drive, it will be appreciated that the principles of the present invention are equally applicable to a belt drive.

The drive sprocket 28 rotates in counterclockwise direction viewing FIG. 4 to drive the ground wheel 12 in a forward direction. In the forward direction, the chain 32 presents an upper taut run and lower slack run (viewing FIG. 4). Conversely, when rotation of the drive sprocket 28 reverses to a clockwise direction, the upper run becomes slack and the lower run becomes taut.

An automatic tensioner, broadly denoted by the numeral 48, applies a tensioning force against the chain 32 to take up slack of the chain as it stretches, while preventing retrograde slackening of the chain caused by shock loads, braking of the mower, or reversing the direction of the chain. The tensioner 48 generally includes tensioning mechanism 50 and an anti-slackening assembly 53. If desired, the tensioning mechanism 50 may be constructed as a conventional idler assembly having an idler arm 52 pivotally mounted on the output assembly 36, an idler wheel 54 rotatably mounted at one end of the arm 52, and a torsional idler spring 56 for biasing the arm 52 in a counterclockwise tensioning direction (viewing FIG. 4) to take up slack of the chain 32. It will be appreciated that if the drive train 26 is constructed as a belt drive, the spring 56 provides a spring bias for the idler arm 52 which not only takes up slack of the belt, but also maintains sufficient tension on the belt to drivingly connect the wheel sheave to the drive sheave.

As best shown in FIG. 4, the mechanism 50 is located so that idler wheel 54 applies a tensioning force against the lower run of the chain 32. Thus, as the chain 32 moves in the forward direction (arrow 55), the idler wheel 54 engages the slack run. It will be appreciated that impulse loads on the drive train 26 and braking by the transmission drive 23 tightens the slack run, which in turn resists the tensioning bias of the mechanism 50. In some instances, such conditions may tend to swing the idler arm 52 in a clockwise slackening direction (viewing FIG. 4), causing untoward slackening of the chain 32. As previously described, reversing the direction of the chain 32 also tightens the slack run, which may similarly tend to cause slackening of the chain 32.

Accordingly, the tensioner 48 is provided with the anti-slackening assembly 53 to prevent such untoward slackening of the chain 32. The anti-slackening assembly includes a control tab 58 swingably mounted on a stub shaft 60 protruding from the frame 16, which in the present illustration happens to be a brake shaft of the mower. The control tab 58 presents a projecting limb 62 having an aperture 64 cut therein, for reasons which will subsequently be described. Preferably, the assembly includes a torsional tab spring 66 for biasing the tab 58 in a counterclockwise direction viewing FIG. 4. As best shown in FIG. 3, the tab 58 is retained on shaft 60 by a sleeve 61, which is fastened to the shaft 60 by diametrical pin 63, and an oversized washer 65 disposed between the sleeve 61 and tab 58.

The anti-slackening assembly 53 further includes a generally cylindrical takeup rod 68, the distal end of which is received within the aperture 64. The aperture 64 is of sufficient size to allow the rod 68 to cant therein, as depicted in FIG. 5. If desired, the rod 68 may be provided with a number of longitudinally spaced, circumferential notches 69, which in the preferred embodiment comprise conventional screw threads. It will be appreciated that the notches 69 engage the limb 62 more aggressively than a smooth surface, which, as will subsequently be described, enhances the operation of the tensioner 48.

The rod 68 is pivotally connected at the lowermost or proximal end thereof to the idler arm 52 end by a small transversely extending leg 70 which is received in an opening 72 of the arm. It will be appreciated that the pivotal connection causes the rod 68 to move generally with the idler arm 52 in the tensioning and slackening directions. If desired, the opening 72 is relatively larger than the diameter of leg 70 to provide a certain amount of lost motion between the arm 52 and rod 68. In other words, the oversized opening 72 allows some play in the idler arm 52 in both the tensioning and slackening direction before the rod 68 is engaged by the periphery of the opening 72 and caused to move thereby. Such over-sizing of opening 72 has been exaggerated for purposes of illustration in FIG. 4.

As will be described in greater detail below, the illustrated arrangement allows the idler arm 52 to pivot freely in the tensioning direction, while preventing retrograde pivoting of the arm 52 in the slackening direction. More particularly, the takeup rod 68 moves generally with the idler arm 52 in the tensioning direction as the mechanism 52 takes up slack of the chain 32. Movement of the rod 68 in the general tensioning direction causes the control tab 58 to pivot in a clockwise direction (viewing FIGS. 4–6) via interengagement of the rod 68 and the interior edge of the aperture 64. Thus, as the idler arm 52 takes up slack of chain 32, the takeup rod moves generally in the tensioning direction to swing the control tab 58 in a clockwise direction to a release position (see FIG. 6), wherein the rod 68 is substantially axially aligned with the aperture 64. This permits the rod 68 to move axially through aperture 64.

It will be appreciated that the notches 69 and bias of the tab spring 66 cooperatively provide incremental swinging of the tab 58, which inhibits infinite tensioning or over-tensioning of the chain 32. More particularly, as the rod 68 moves in the general tensioning direction, the notches 69 engage the periphery of the aperture 64 to swing the tab 58 in the clockwise direction until the rod 68 and aperture 64 are sufficiently axially aligned so that the rod 68 may pass through the aperture 64. However, the counterclockwise bias of the tab 58 and the space provided by each of the notches 69 tend to cause the periphery of the aperture 64 to catch successive notches 69 so that each notch 69 must swing the tab 58 to the release position before it passes therethrough. In other words, the takeup rod 68 moves incrementally through the aperture 64 by cooperation of the notches 69 and the bias of spring 66 to swing the tab 58 to and from the release position, as each notch 69 passes through the aperture 64.

It will be appreciated that if a tab spring 66 is provided to bias the tab 58 in the counterclockwise direction (viewing FIG. 6), the bias of tab spring 66 must be less than the bias of idler spring 56 so that the idler arm 52 is able to move freely in the tensioning direction. Further, it is entirely within the scope of the present invention to provide a takeup rod having a smooth surface and to provide the assembly 53 without spring 66 for biasing the control tab in the counterclockwise direction.

Once the tensioning mechanism 50 has taken up the slack of chain 32, movement of the arm 52 and rod 68 in the tensioning direction ceases and the tab spring 66 biases the tab 58 into a locking position (see FIG. 5), wherein the rod 68 pivots to a canted disposition within the aperture 64. Accordingly, if the chain direction is reversed or if the chain experiences other loads that tighten the slack run such as impulse or braking loads, the interengagement of the rod 68 and limb 62 prevents retrograde movement of the rod 68 and idler arm 52 in the slackening direction. In this respect, although the notches 69 enhance the interengagement of the rod 68 and limb 62, a takeup rod having a smooth surface will provide ample frictional interengagement to prevent slippage between the rod 68 and limb 62, when the tab 58 is in the locking position.

Further, the assembly 53 may be provided without the tab spring 66, in which case the tab 58 remains primarily in the release position during operation and swings to the locking position upon tightening of the slack run. Similar action may occur even when a tab spring 66 is provided if while the control tab 58 is in the release position, the chain 32 is suddenly reversed, which tightens the slack run. In either case, as the idler arm 52 and takeup rod 68 move in the slackening direction responsive to tightening of the slack run, the interengagement of the rod 68 and periphery of the aperture 64 causes the tab 58 to swing in a counterclockwise direction until the rod 68 cants within the aperture 64 (the aforementioned locking position), henceforth preventing further movement of the arm 52 and rod 68 in the slackening direction. Of course, in an anti-slackening assembly 53 having the tab spring 66, the tab 58 is also biased to the locking position by the spring 66. Although the idler arm 52 must pivot in the slackening direction before the tab 58 is caused to swing to the locking position, it will be appreciated that such retrograde pivoting is relatively minimal and does not allow the chain 32 to significantly slacken.

Accordingly, as the chain 32 stretches, the idler spring 56 pivots the idler arm 52 in the tensioning direction applying a tensioning force against the slack run of the chain 32 to take up slack of the chain 32. Once the arm 52 has sufficiently moved so that the periphery of the opening 72 engages the leg 70, the takeup rod 68 moves with the arm 52 generally in the tensioning direction. The takeup rod 68 swings the tab 58 in the clockwise direction viewing FIGS. 4–6 until the tab 58 reaches the release position (FIG. 6), wherein the rod 68 is substantially axially aligned with the aperture 64 permitting the rod 68 to pass therethrough. The tab spring 66 swings the tab 58 in the counterclockwise direction to catch the successive notch 69 providing the aforementioned incremental swinging of the tab 58 as the chain 32 is tensioned. Once all the chain slack has been taken up by the tensioning mechanism 50, the tab spring 66 swings the tab 58 to the locking position (FIG. 5), wherein the rod 68 pivots to a canted position within the aperture 64. It will be appreciated that unless the tensioner 48 is in the process of tensioning the chain 32 (i.e., taking up slack of the chain 32), which is fairly seldom, the tab 58 is biased by the tab spring 66 to the locking position. With the tab 58 normally in the locking position, it will be appreciated that shifting of the drive train 26 from forward to reverse is relatively quick.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. The inventors hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. In a self-propelled mower including propulsion means for propelling the mower, a ground wheel, and a drive train drivingly connecting the ground wheel to the propulsion means, wherein the drive train includes a rotatable, drive member coupled with said propulsion means, a rotatable driven member coupled with said ground wheel, and a flexible, endless element entraining said members, an automatic tensioner comprising:

tensioning mechanism for tensioning said element, said tensioning mechanism including a pivotal idler arm, an idler member rotatably supported by said arm, and arm biasing means for biasing said arm in a tensioning direction such that the idler member applies a tensioning force against the element; and an anti-slackening assembly for preventing retrograde movement of said idler arm in a slackening direction, said anti-slackening assembly including an elongated takeup rod having proximal and distal ends, said takeup rod being pivotally coupled with said idler arm at its proximal end such that the takeup rod moves generally with said idler arm in said tensioning and slackening directions, and a swingable control tab having an aperture receiving the distal end of the takeup rod, said takeup rod engaging the aperture of the control tab to swing the control tab to a disposition in which the takeup rod is generally aligned with the aperture permitting relative movement therebetween as the idler arm and takeup rod move in said tensioning direction, and to alternatively swing the control tab to a locking position in which the takeup rod is canted within the aperture to prevent the idler arm and takeup rod from moving in said slackening direction.

2. In a mower as claimed in claim 1, said takeup rod including a transversely extending leg received in an oversized opening in said idler arm providing lost motion between the idler arm and takeup rod such that the idler arm may absorb minimal force or shock impulses of the element before moving the takeup rod in the tensioning or slackening direction.

3. In a mower as claimed in claim 2, said distal end of the takeup rod having a plurality of longitudinally spaced circumferential notches for promoting swinging of the control tab to the locking position.

4. In a mower as claimed in claim 1, said distal end of the takeup rod having a plurality of longitudinally spaced circumferential notches for promoting swinging of the control tab to the locking position.

5. In a mower as claimed in claim 1, said anti-slackening assembly further including tab biasing means for biasing the control tab into said locking position, said tab biasing means being relatively less than said idler biasing means so that the takeup rod and idler arm move freely in the tensioning direction.

6. In a mower as claimed in claim 5, said distal end of the takeup rod having a plurality of longitudinally spaced, substantially similar circumferential notches promoting swinging of the control tab to the locking position and cooperating with said tab biasing means to provide incremental movement of the takeup rod through the aperture.

7. In a mower as claimed in claim 1; and said drive member and driven member being sprockets and said element being a chain entraining said sprockets.

8. In a mower as claimed in claim 1; and said drive member being reversible, said reversible drive member rotating in a first direction to move the element in a forward direction and a second direction to move the element in a reverse direction, said element presenting alternating taut and slack runs as the element movement shifts from the forward to the reverse direction, said tensioning mechanism being located such that the idler member applies said tensioning force against the slack run of the element as the element moves in the forward direction.

* * * * *